(12) United States Patent
Jiang et al.

(10) Patent No.: US 10,371,961 B2
(45) Date of Patent: Aug. 6, 2019

(54) SYSTEMS AND METHODS FOR RETENTION OF LENSES IN EYEGLASS FRAMES USING ELASTIC CUSHION CONNECTORS

(71) Applicant: Essilor International, Charenton-le-Pont (FR)

(72) Inventors: Peiqi Jiang, Dallas, TX (US); John Guerra, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/541,196

(22) PCT Filed: Dec. 31, 2014

(86) PCT No.: PCT/IB2014/003146
§ 371 (c)(1),
(2) Date: Jun. 30, 2017

(87) PCT Pub. No.: WO2016/108066
PCT Pub. Date: Jul. 7, 2016

(65) Prior Publication Data
US 2017/0357103 A1  Dec. 14, 2017

(51) Int. Cl.
*G02C 5/00* (2006.01)
*G02C 1/04* (2006.01)
*G02C 1/06* (2006.01)

(52) U.S. Cl.
CPC ............ *G02C 1/04* (2013.01); *G02C 1/06* (2013.01); *G02C 2200/06* (2013.01); *G02C 2200/08* (2013.01)

(58) Field of Classification Search
CPC ... G02C 1/04; G02C 1/06; G02C 1/10; G02C 5/001; G02C 13/001; G02C 2200/20
(Continued)

(56) References Cited

U.S. PATENT DOCUMENTS 2,914,986 A     12/1959  Zakin
6,164,775 A  *  12/2000  Zider .................... G02C 1/023
                                                               351/110
(Continued)

FOREIGN PATENT DOCUMENTS

GB          792681 A    4/1958
WO      2010023703 A1   3/2010

OTHER PUBLICATIONS

ISR/WO for International Appln. No. PCT/IB2014/003146; dated Sep. 1, 2015.

*Primary Examiner* — Darryl J Collins
(74) *Attorney, Agent, or Firm* — Oblon, McClelland, Maier & Neustadt, L.L.P.

(57) ABSTRACT

User configurable eyeglasses employing retention of lenses in eyeglass frames using elastic cushion connectors may include a pair of lenses, each lens comprising at least one tab extending from the lens. An eyeglasses frame may define at least two fittings, each fitting positioned to receive one tab extending from a lens and each fitting sized larger than the tab to be received. A plurality of eyeglass lens retention cushions are each adapted to be disposed in one of the fittings and to receive one of the tabs. Each eyeglass lens retention cushion might have an elastic cushion body having a relaxed, or in situ, exterior size larger than an interior socket of the fittings and may have an interior opening with a relaxed, or in situ, size smaller than a tab extending from an eyeglasses lens.

18 Claims, 5 Drawing Sheets

(58) Field of Classification Search
USPC .................................. 351/106, 154, 159.01
See application file for complete search history.

(56) References Cited

U.S. PATENT DOCUMENTS

| | | | |
|---|---|---|---|
| 6,217,169 | B1 | 4/2001 | Hirschman et al. |
| 7,510,279 | B2* | 3/2009 | Van Atta ................. G02C 1/04 351/105 |
| 2002/0029408 | A1 | 3/2002 | Lindahl |
| 2003/0058401 | A1* | 3/2003 | Preutz ..................... G02C 1/02 351/86 |
| 2007/0132944 | A1 | 6/2007 | Sheldon |
| 2008/0199272 | A1 | 8/2008 | Limpert et al. |
| 2010/0290000 | A1* | 11/2010 | Krumme ................ G02C 1/023 351/140 |
| 2013/0271723 | A1 | 10/2013 | Calilung et al. |

* cited by examiner

SYSTEMS AND METHODS FOR RETENTION OF LENSES IN EYEGLASS FRAMES USING ELASTIC CUSHION CONNECTORS

TECHNICAL FIELD

The present disclosure relates generally to eyeglasses, more particularly to methods and mechanisms for retaining lenses in eyeglass frames, and specifically, in certain embodiments, to user configurable eyeglasses employing elastic cushion connectors to retain user-selected ophthalmic lenses in user-selected eyeglass frames.

BACKGROUND

In typical eyeglass lens and frame design, each lens is generally round, generally rectangular, etc., edged to fit a specific frame shape. The lenses are fitted into a frame by a skilled optician, typically held in place using a small screw, a magnet, adhesive or mechanical locking. An end user, such as the eyeglass wearer cannot easily mount (or remount) lenses into the frame. Further, it is not typically possible, or at least practical, for an eyeglass wearer to switch the lenses with another pair of lenses, such as lenses of a different type, for example to switch to sunglass lenses from regular clear lenses. Additionally, after extended use, the frame, particularly a screw or other rigid lens retention mechanisms, may become loose, and there is a risk that the lens could be easily separated from the frame during wear of the eyeglasses.

For example, prior solutions for securing lenses in frames have included disposition of flanges at a lens edge, which are drilled to provide a (threaded) hole to receive a frame retention screw. However, as noted above with use, such screws can loosen, and/or the threads in the hole may strip, allowing the lens to be easily separated from the frame. Other solutions have called for the use of magnets fitted onto an edge of a lens and/or into a frame-defined slot to hold the lens into place. Another solution calls for use of mechanical rigid locks to index with a flange extending from the lens to hold the lens in place.

SUMMARY

The present invention is directed to systems and methods which provide user configurable eyeglasses that include a pair of lenses, each lens having at least one tab extending from the lens and an eyeglasses frame defining at least two fittings, each fitting positioned to receive one tab extending from a lens, each fitting sized larger than the tab to be received. In some embodiments, each lens has at least a pair of generally opposing tabs extending from the lens, and the frame defines a pair of generally opposing fitting pairs, each fitting positioned to receive one tab extending from a lens.

A plurality of elastic cushion connectors, are each adapted to be disposed in one of the fittings and to receive one of the tabs extending from one of the lenses. The elastic cushion connectors may be formed from a silicone polymer, or the like. These eyeglass lens retention cushions have an elastic cushion body having a relaxed exterior size larger than an interior cavity or socket of the fittings and define an interior opening having a relaxed size smaller than the tab extending from the eyeglasses lens corresponding to a position of the fitting. Thus, each lens snap-fits into the frame with the elastic cushion connectors tensioning each lens in the frame, such as between one fitting pair.

An implementation for retaining lenses in eyeglass frames using elastic cushion connectors may call for disposing or defining at least one tab at an edge of a lens, extending from the lens. These tabs may be attached to the lens, form or shaped from the lens, or the like, so as to extend from the lens. Correspondingly, a plurality of fittings are defined by an eyeglasses frame, each fittings positioned to correspond to a tab extending from the lens, and each fitting defining an interior socket larger than a corresponding tab. As noted, an elastic cushion connector is disposed between each of the fittings and the corresponding tab, in the fitting socket and at least partially around the corresponding tab, flexibly securing the lens into the frame.

To dispose the elastic cushion connector between the corresponding tab and the fitting, flexibly securing the lens into the frame, the elastic cushion connector may be placed at least partially around the corresponding tab and the elastic cushion connector and tab may be snap-fitted into the socket of the fitting. Alternatively, the elastic cushion connector may be inserted into the socket of the fitting and then the corresponding tab inserted into the interior opening of the elastic cushion connector, snap-fitting the lens into the frame.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
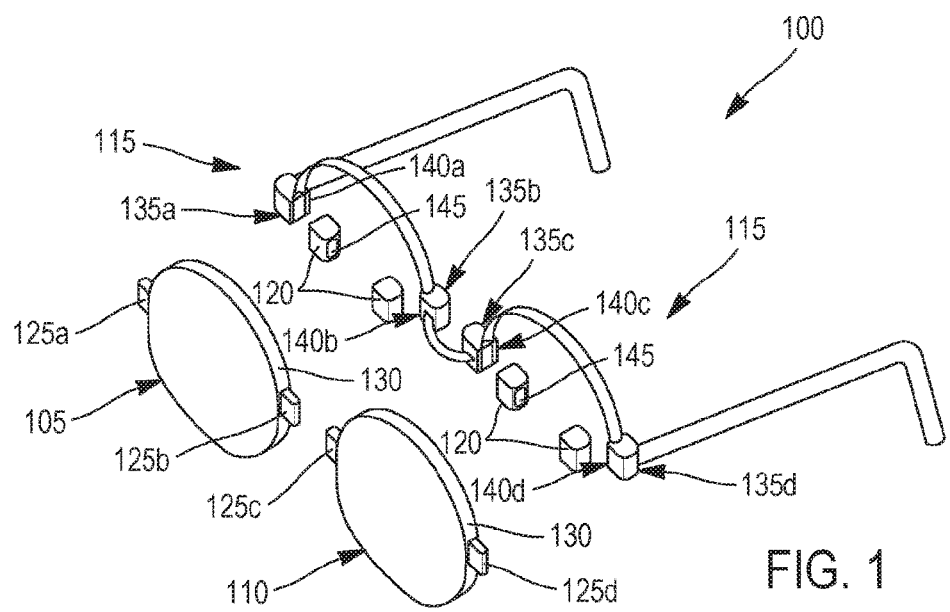
Figure 2A:
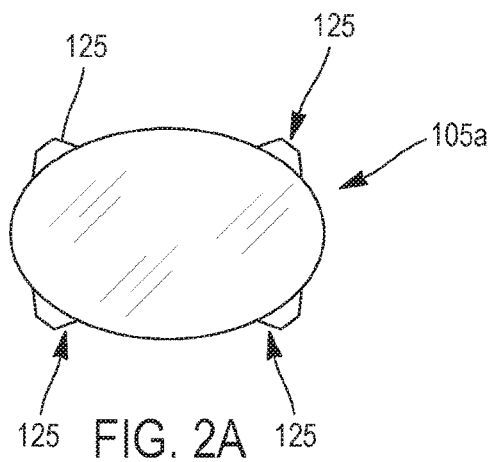
Figure 2B:
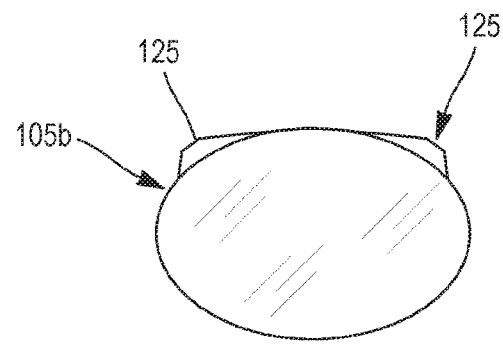
Figure 2C:
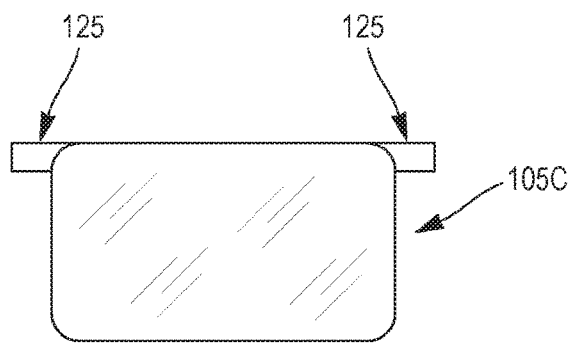
Figure 2D:
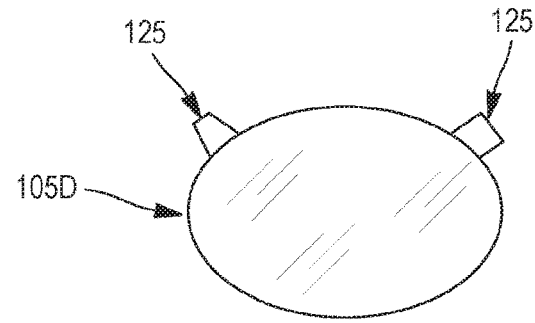
Figure 3A:
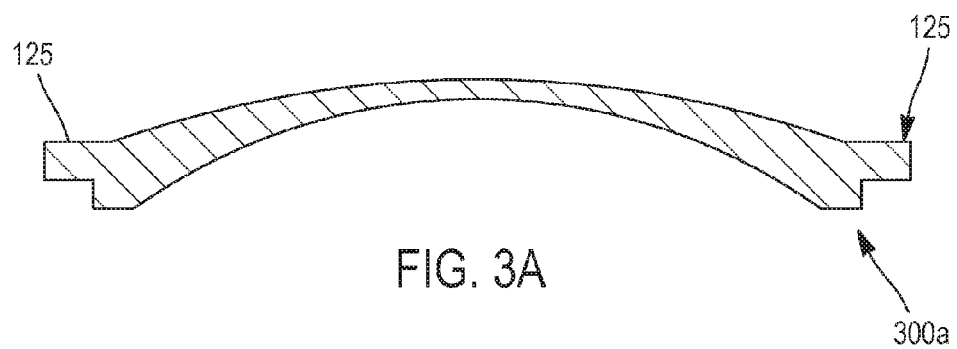
Figure 3B:
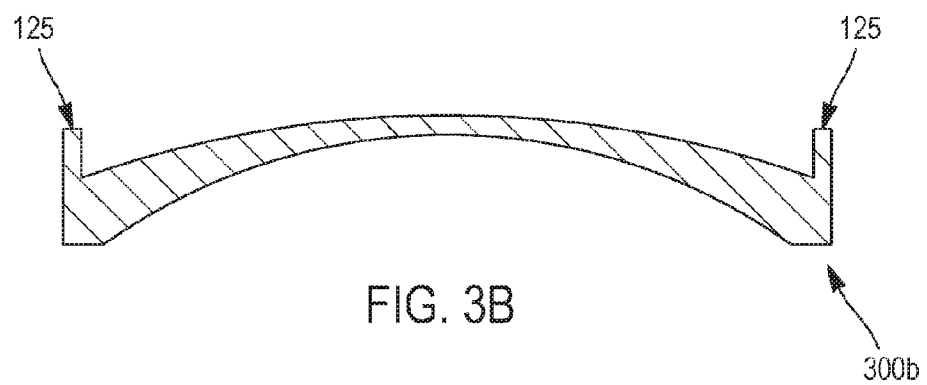
Figure 3C:
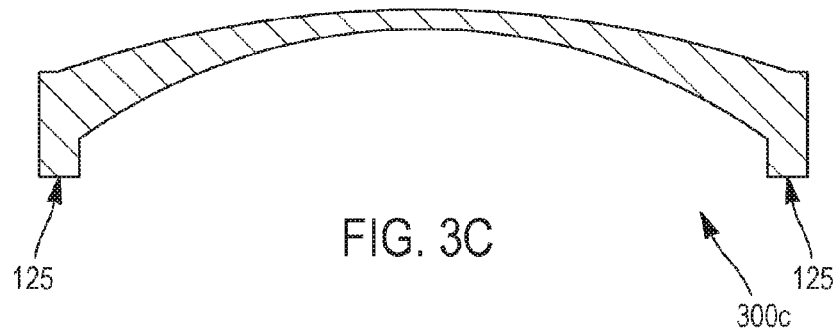
Figure 4A:
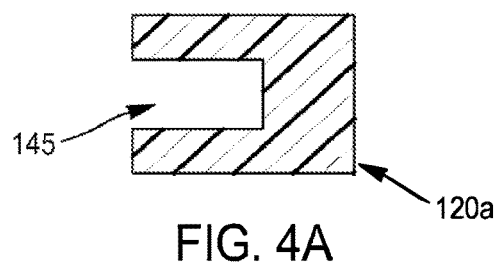
Figure 4B:
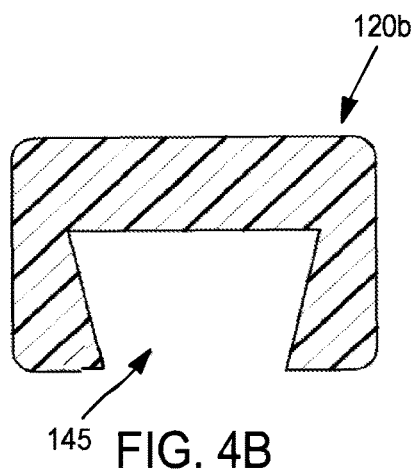
Figure 4C:
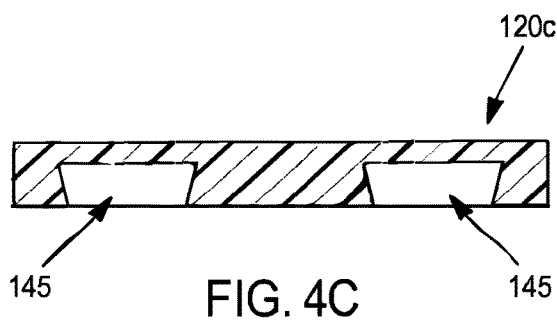
Figure 4D:
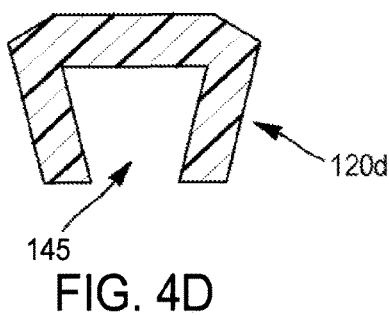
Figure 4E:
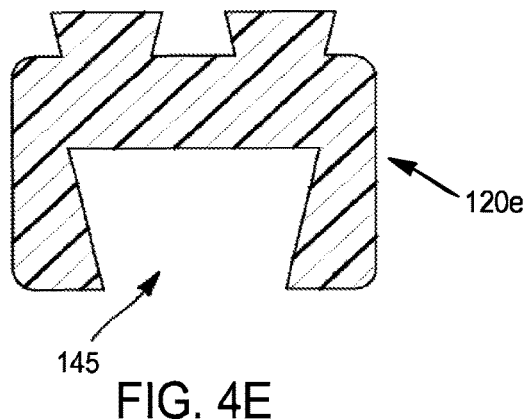
Figure 5:
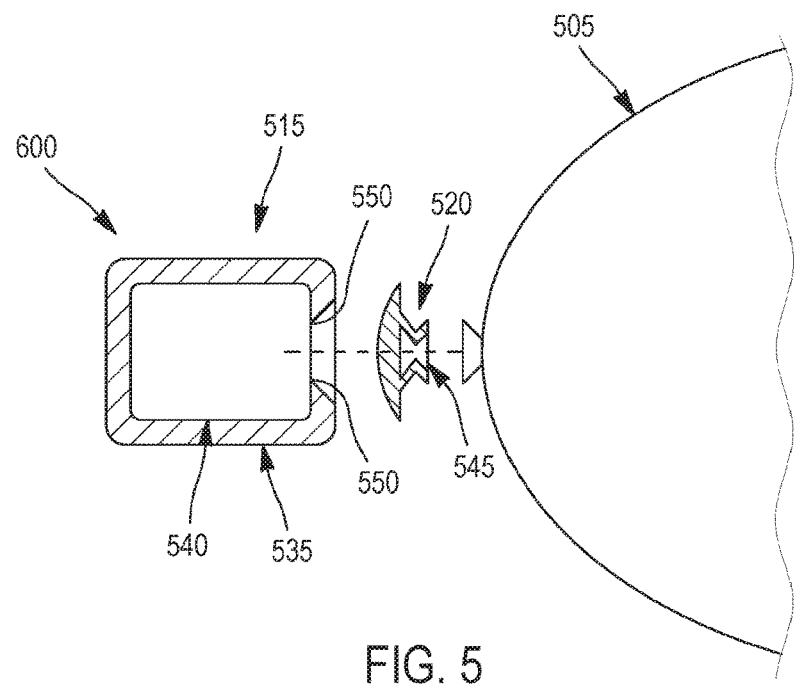
Figure 6:
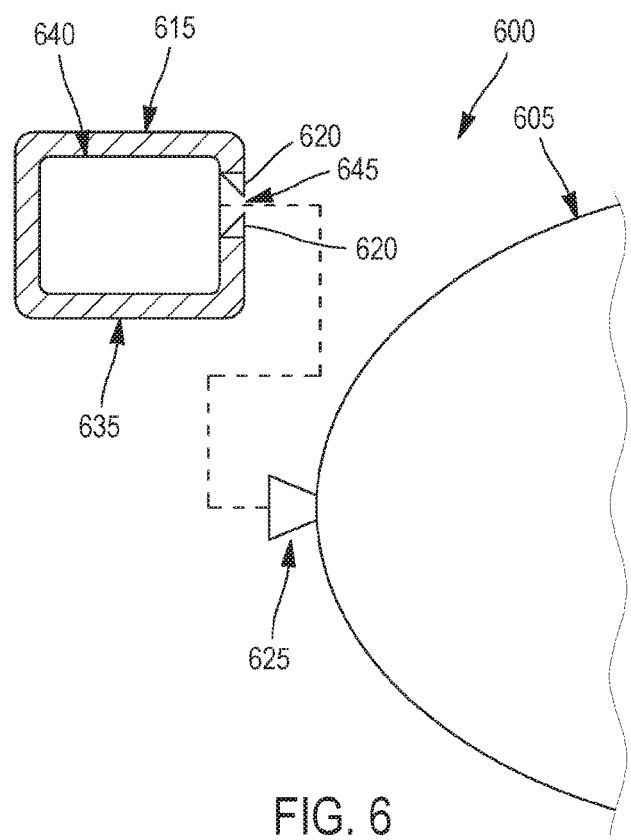
Figure 7:
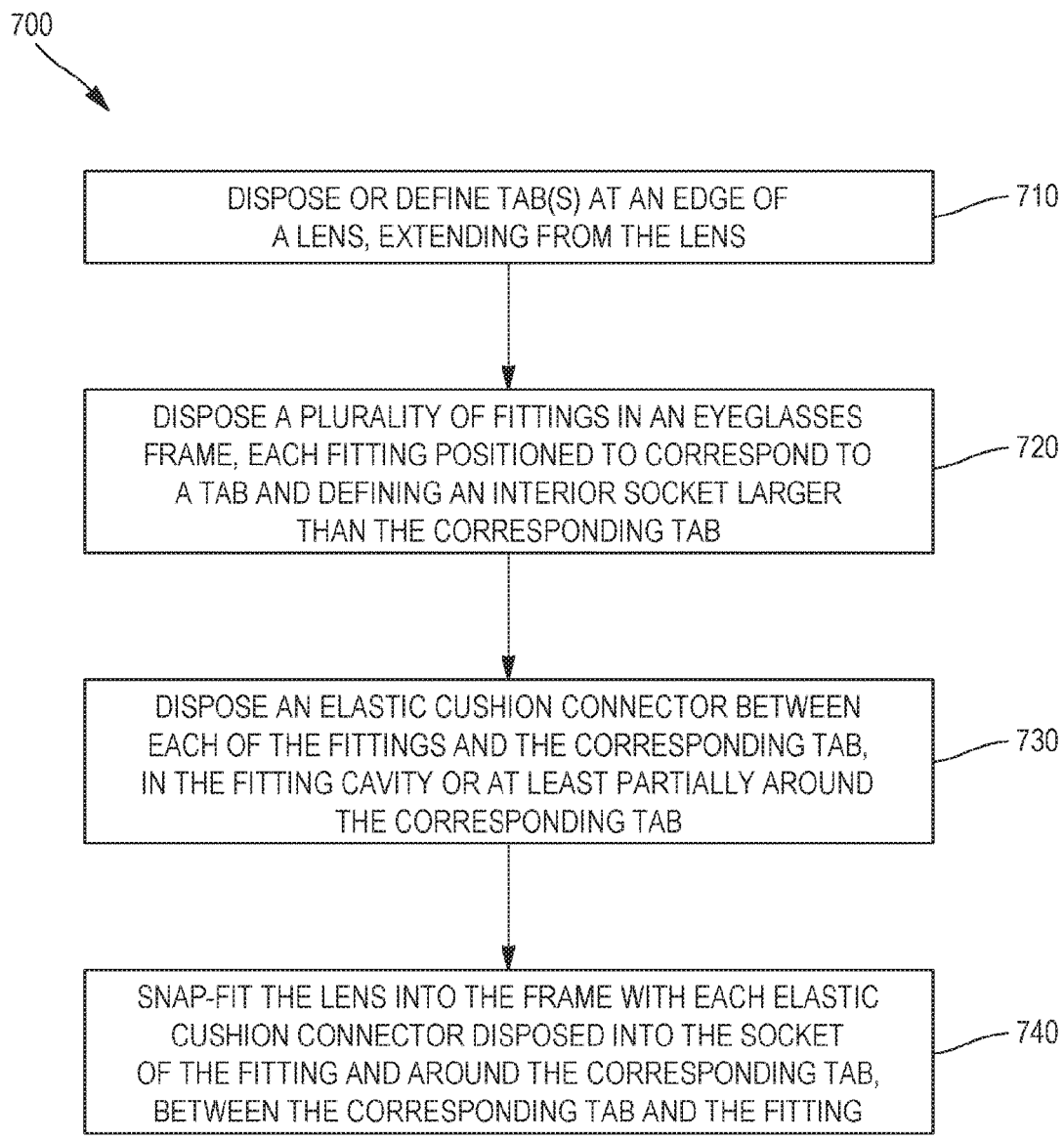

Having thus described the invention in general terms, reference will now be made to the accompanying drawings, which are not necessarily drawn to scale and which are incorporated in and form part of the specification and in which like numerals designate like parts, illustrate embodiments of the present invention and together with the description, serve to explain the principles of the invention. In the drawings:

FIG. 1 is an exploded perspective view of an example embodiment of a pair of eyeglasses showing a system for retention of lenses in an eyeglass frame using elastic cushion connectors, according to some embodiments;

FIGS. 2A through 2D are front plan views of further example embodiments of lenses adapted for use in accordance with some embodiments of the present systems and methods;

FIGS. 3A through 3C are generally cross-sectional views of example ophthalmic lenses adapted for use in accordance with some embodiments of the present systems and methods;

FIGS. 4A through 4E are generally cross-sectional views of example embodiments of elastic cushion connectors adapted for use in accordance with some embodiments of the present systems and methods;

FIG. 5 is an exploded fragmented perspective view of an example embodiment showing a curved, self-locking cushion connector and a coordinating (fragmented) lens and frame fitting, according to some embodiments;

FIG. 6 is an exploded perspective view of an example embodiment showing a lens having tabs and frame fittings defining cushion connectors about an edge of a fitting socket, according to some embodiments; and FIG. 7 is a flowchart of an example implementation for retaining lenses in eyeglass frames using elastic cushion connectors, in accordance with some embodiments of the present systems and methods.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Embodiments of the present systems and methods are generally directed to eyeglasses, more particularly to methods and mechanisms for retaining lenses in eyeglass frames, and specifically in certain embodiments to user configurable eyeglasses employing elastic cushion connectors to retain user-selected ophthalmic lenses in user-selected eyeglass frames. In accordance with embodiments of the present systems and methods, user configurable eyeglasses may retain lenses in eyeglass frames using elastic cushion connectors. Such eyeglasses may include a pair of lenses, each lens comprising at least one tab extending from the lens and an eyeglasses frame defining at least two fittings, each fitting positioned to receive one tab extending from a lens and each fitting sized larger than the tab to be received. A plurality of eyeglass lens retention cushions are each adapted to be disposed in one of the fittings and to receive one of the tabs. Each eyeglass lens retention cushion might have an elastic cushion body having a relaxed, or in situ, exterior size larger than an interior socket of the fittings and may have an interior opening with a relaxed, or in situ, size smaller than a tab extending from an eyeglasses lens.

As noted, existing solutions mount a lens into a frame using a small screw, adhesive, magnetic material, mechanical locker, and/or the like, which are not user friendly form the standpoint that they do not allow a user to easily switch to another type of lens, afford easy repair by the user, or the like. In contrast, embodiments of the present systems and methods for retention of lenses in eyeglass frames employ a lens edge with a tab, wherein a soft cushion connector is disposed between lens and the frame. The frame (both rimless or rimmed) defines a shape or fitting to hold the tab connector. Mounting of the lens is easily carried-out by pressing, pushing or squeezing, the lens into the frame, deforming the cushion connector(s). Hence, embodiments of the present systems and methods can be used by a lens prescription lab in lens finishing processes and by eyeglass frame makers with a number of benefits for eyeglasses customers. It may also allow the wearers to be able to switch easily between any lens types via soft cushion connectors.

While embodiments of the present systems and methods for retention of lenses in eyeglass frames using elastic cushion connectors are described herein with reverence to lenses, prescription eyewear and the like, the present systems and methods may be employed to retain any sort of lenses in eyeglass frames using elastic cushion connectors, including such as safety glasses, sunglasses, sport glasses, swim goggles, or the like.

FIG. 1 is an exploded perspective view of an example embodiment of a pair of eyeglasses (100) showing a system for retention of lenses 105, 110 in eyeglass frame 115 using elastic cushion connectors 120, according to some embodiments. Such user configurable eyeglasses 100 may, in accordance with embodiments of the present systems and methods, have a pair of lenses 105, 110 each lens comprising at least one tab 125a-d extending from lenses 105 and 110. (Herein, the lens tabs are generally referred to collectively as "tabs 125," or individually as "tab 125.") In accordance with embodiments of the present systems and methods, a lens edge shape has a tab attached to, or otherwise defined in, edge 130 of the lens, such as during edging or surfacing. This tab is used in conjunction with a soft cushion connector for flexibly securing the lens into the frame.

Eyeglasses frame 115 illustrated in FIG. 1 defines two pairs of fittings 135a-d. (Herein, the frame fittings are generally referred to collectively as "fittings 135," or individually as "fitting 135.") The number of fittings defined by an eyeglasses frame in accordance with the present systems and methods, corresponds to the number and position of tabs extending from the lens edge(s) (130). Each fitting 135 positioned to receive one tab 125 extending from a lens 105 or 110, and each fitting 135 defining cavity or socket 140a-d sized larger than the corresponding tab 125a-d to be received. (Herein, the fitting sockets are generally referred to collectively as "fitting sockets 140," or individually as "fitting socket 140.")

A plurality of relatively soft, generally elastic cushion connectors 120 are employed in accordance with embodiments of the present systems and methods. These cushion connectors are adapted to be disposed in one of fittings 135 or onto one of tabs 125, such that fitting 135 (fitting socket 140) receives (corresponding) tab 125 extending from one of lenses 105 or 110, with cushion connector 120 captured and compressed therebetween. That is to say, the cushions may be held in the fitting sockets by tension, interference fit, and/or the like, while the tabs may be held in the cushions through tension, an interference fit, and/or the like. To this end, in accordance with embodiments of the present systems and methods, eyeglass lens retention cushion 120 is an elastic cushion body having a relaxed, or in situ, exterior size slightly larger than an interior, that is an interior socket 140, of fitting 135 defined by eyeglasses frame 115. Further, eyeglass lens retention cushion 120 defines interior opening 145 having a relaxed, or in situ, size slightly or somewhat smaller than tab 125 extending from eyeglasses lens 105 or 110. Correspondingly, in accordance with embodiments of the present systems and methods, the retention cushion elastic body may have a compressed exterior size slightly or somewhat smaller than socket, while an expanded size of interior opening 145 of cushion 120 is slightly larger than tab 125.

FIGS. 2A through 2D are front plan views of example embodiments of lenses 105a-d adapted for use in accordance with some embodiments of the present systems and methods. Each of lenses 105a-d is an example of a tabbed lens, which will fit into embodiment frames, via cushion connectors 120. Lens 105 from FIG. 1 may be any of lens 105a-d, and Lens 110 from FIG. 1 may be a corresponding lens thereto. (Lenses 105a-105d are generally referred to collectively as "lenses 105," or individually as "lens 105" herein.) As illustrated, each lens 105 may have a pair of generally opposing (if not diametrically opposing) tabs 125 extending from the lens, in accordance with various embodiments of the present systems and methods. However, generally speaking, there is no limit to size, shape, position or numbers of these tabs 125. Generally, any lens materials can be cut with a tab attached onto the lens (105), in accordance with embodiments of the present systems and methods.

As noted, this tabbed lens can be fit easily in any number of frame designs employing the fittings (135), described above and below, using a cushion connector (120) to fit the tab. For example, lens 105b of FIG. 2B may be fitted into a frame by pushing first one tab into a fitting socket holding a cushion connector then rotating the lens, pressing against the cushion connector of the installed tab to install the second tab, to snap fit the lens into the frame. As a further example, lens 105c of FIG. 2C may be fitted into a frame by sliding the lens along a top wire of the frame, pressing a first tab into a fitting socket holding a cushion connector. Then, the top of the lens is slid along the lens frame, against the cushion connector of the installed tab to provide room to insert a second cushion connector between the other tab and the other frame fitting. The lens is then slid back along the frame, into the second cushion connector, pushing the second cushion connector into the socket of the second fitting, and flexibly securing the lens between the fittings. A lens, such as lens 105d of FIG. 2D, having different shaped tabs may be used with differently shaped or configured cushion connectors and/or frame fittings in a single pair of eyeglasses.

FIGS. 3A through 3C are generally cross-sectional views of example ophthalmic lenses 300a-300c adapted for use in accordance with some embodiments of the present systems and methods. Each of lenses 300a-c is an example of a tabbed lens, which will fit into embodiment frames, via cushion connectors 120. As noted, in accordance with embodiments of the present systems and methods, the lens tab can be attached to the lens edge to extend outward from the lens, or formed in the lens edge to extend outward, as illustrated in FIGS. 3A through 3C. Thus, by way of example and in accordance with various embodiments of the present systems and methods, the lens tab can be attached to, or formed in, the lens edge to extend outward, generally along a plane of the lens or it can be attached to, or formed in, a front side or back side of the lens edge, extending generally perpendicular to the plane of the lens. For example, FIG. 3A shows tabs of lens 300a extending outward, generally along a plane of the lens, while FIG. 3B illustrates lens 300b, wherein the tabs extend forward from the lens edge, and in FIG. 3C, the tabs of lens 300c extend rearward.

As noted, the present soft cushion connector 120 may be "elastic." That is, being generally deformable, but resiliently returning to its at-rest (in situ) shape. This elastic cushion connector is adapted to be disposed between the lens tab and the frame, such as on the tab and within a fitting or socket defined by, in, or along the frame's frame wire, so that the lens tab can be easily mounted into the frame by pressing, pushing and/or squeezing. In accordance with embodiments of the present systems and methods, the design and material properties of the cushion connector securely fit the lens tightly into an eyeglasses frame. For example, the cushion connectors may be made of materials such as an elastomer, silicon, polymer, rubber, plastic, composite materials, metal-plastic hybrid materials (such as alumina-rubber), etc. Also, the material can range from a soft elastomer/silicon to a rigid rubber or rigid composite. The connector may have a soft interior to receive a tab and a generally rigid exterior, and/or one side of the connector can be softer while another side is rigid. In one example connector 120 may be made of silicone polymer rubber, or a similar material, such as with a modulus of elasticity (Young's Modulus) in the range of 0.001 to 1.0 GPa, or about 145 to 150,000 psi. Depending on the lens tab shape, position, etc., one or more of a number of cushion connectors can be adapted to the tab shape and the frame design. For example, FIGS. 4A through 4E are generally cross-sectional views of example embodiments of cushion connectors 120a-e adapted for use in accordance with some embodiments of the present systems and methods.

Leveraging the lens tab 125 and cushion connector 120, embodiment frames 115 function to hold lenses tightly, via the cushion connectors 120. Such frames allow the lens to be easily fitted into the frame via manually pushing, pressing and/or squeezing by the user/wearer, as well as upon initial assembly. When needed, these frames can be easily switched to another type of lens. Based on the tab and cushion connector, shape and position, an eyeglasses frame can be provided with tab-connector holding functions, such as a set of corresponding fitting, which may generally define sockets or sockets that allow the lens to be easily mounted into the fame by eyeglass wearers. Any number of frame designs and hold shapes (e.g. fittings 135) can be employed. The frame can be either rimless-type or rim-type frames.

Returning to FIG. 1, illustrated frames 115 defines a pair of generally opposing fitting pairs, each fitting 135 positioned to receive one tab 125 extending from a lens (105). Thus, in accordance with such embodiments, each lens 105 snap-fits into frame 115 with elastic cushion connectors 120 tensioning each lens 105 in frame 115 between one fitting pair (i.e. between a pair of fittings 135). In various other embodiments, more that two (opposing) tabs 125 (e.g. lens 105a of FIG. 2A) and fittings 135 may be employed, generally, with a corresponding number of cushion connectors 120. In further alternative embodiments, a single tab may be formed or attached to extend from edge 130 of lens 105 to be captured by a fitting socket 140, with cushion connector 120 compressed therebetween, with a generally opposite side of the lens held in place by a generally rigid eyeglasses frame structure (e.g. a semicircular groove or notch, defined in the frame wire, or the like).

FIG. 5 is an exploded, fragmented perspective view of example embodiment 500 showing curved, self-locking cushion connector 520 and coordinating lens 505 having generally triangular tab 525 and frame 515 having fitting 535 defining socket 540 having edge(s) 550, according to some embodiments. This curve shaped cushion connector and self-lock function to firmly lock the lens and frame following assembly. Therein, cushion connector 520 is correspondingly shaped to snap-fit into fitting socket 540 engaging socket edge 550 and to receive generally triangular tab 525 in cushion opening 545. As shown, the connector gate on lens side (i.e. cushion connector opening 545) can be smaller than the gate on frame side (i.e. opening 555 defined by fitting socket edges 550), However, in accordance with other embodiments the lens side gate could be larger than the frame side gate.

In accordance with various other embodiments of the present systems and methods, the cushion connector can be built into an eyeglasses frame, such as into an eyeglasses frame fitting to receive a lens tab. By way of example, FIG. 6 is an exploded perspective view of example embodiment 600 showing lens 605 having tab 625 and frame 615 having fitting 635 defining cushion connector 620 defined about an edge of socket 640 for receiving and retaining tab 625, according to some embodiments. In accordance with such embodiments lens 605 with tab 625 may be easily fit into frame 615 by pressing, pushing and/or squeezing. As with other embodiments connector 620 can be of any number of shapes with a compatible function to fix lens 605 into the frame via shaped tab 625.

FIG. 7 is a flowchart of example implementation 700 for retaining lenses (105 or 110) in eyeglass frames (115) using elastic cushion connectors (120), in accordance with some embodiments of the present systems and methods. Therein, at least one tab (125) is disposed or defined at an edge (130) of a lens, at 710 to extend from the lens. The tab(s) 125 may be attached to the lens, formed or shaped from the lens, or otherwise provided so as to extend from the lens. An ophthalmic lens prescription laboratory may adapt lenses for use in accordance with the present systems and methods during lens finishing, such as by forming or attaching at least one tab at an edge of each lens. This tab can be any number of shapes and any practical number of tabs can be used. As noted, the tab can be attached to, or formed in, the lens edge to extend outward, generally along a plane of the lens or it can be attached to, or formed in, a front side or back side of the lens edge, extending generally perpendicular to the plane of the lens. In particular and in accordance with some embodiments of the present systems and methods, the lens edge tab may be formed through use of five-axis milling technology, such as may be provided by a prescription ophthalmic lens edger typically referred to as an all-in-one edger (e.g. a Satisloh® ES-Curve™ edger, or the like) or any of a number of ophthalmic fine lens cutting processes, particularly employing Computer Aided Drafting (CAD), or similar editing software to manage forming of the tab(s) in the final lens shape. Further, since the tab is positioned during the edging step, lens axis and orientation may be easily adjusted by adjusting the position of the tab relative to the lens and its axis, whether the tab is attached of formed through edging.

Correspondingly, a plurality of fittings (135) are defined in an eyeglasses frame (115) at 720. In accordance with the present systems and methods, one of the fittings (135) is positioned to correspond to one tab (125) extending from the lens (105 or 110) with each fitting defining an interior socket (140) larger than a corresponding tab (125). At 730 an elastic cushion connector (120) is provided to be disposed between each of the fittings (135) and the corresponding tab (125), in the fitting socket 140 and at least partially around the corresponding tab (125), to be used to flexibly secure the lens (105 and 110) into the frame (115). As noted, in accordance with embodiments of the present systems and methods The elastic cushion connector (120) may have a relaxed/in situ exterior size larger than an interior socket (140) of one of the fittings (135) and an interior opening (145) having a relaxed/in situ size smaller than one of the tabs (125) extending from one of the lenses (105 or 110).

At 740 the lens (105 or 110) is snap-fitted, or otherwise flexibly securely fitted into the frame (115) by disposing the elastic cushion connector (120) into the interior socket (140) of the fitting (135) and around a corresponding tab (125) extending from the edge (130) of the lens (105 or 110), between the corresponding tab 125 and the fitting (135). This latter step (740) may be reversed and repeated by an end user to remove one set of lenses and to install an alternative set of lenses. Disposing the elastic cushion connector between the corresponding tab (125) and fitting (135) may be accomplished by placing the elastic cushion connector (120) at least partially around the corresponding tab (125) and snap-fitting the elastic cushion connector and tab combination into the appropriate fitting's socket (140). Alternatively, and equally applicable, disposing the elastic cushion connector between the tab and fitting may be accomplished by inserting the elastic cushion connector (120) into the fitting (140) (i.e. into the socket (140) of the fitting (135) and inserting the corresponding tab (125) into the interior opening (145) of the elastic cushion connector, snap-fitting the lens (105 or 110) into the frame (115). Either of these latter two methods may be employed by an end user to install an alternative set of lenses and may be completed by pressing, pushing or squeezing, the lens (105 or 110) into the frame (115), deforming the cushion connector(s) (120) at least partially into the fitting sockets (140).

Advantageously, the present systems and methods afford easy mounting and/or remounting of the lens into the frame by a technician, the eyeglass wearer, etc., without the use of screws, magnets, adhesives, mechanical locking, or the like. Hence, it is easier to switch another type of lenses into the frame (e.g. clear lens to sun lens) by the eyeglass wearer. Similarly, it is possible for the wearer to switch to another type of frame with same type of tab hold (e.g. similar positioned fittings). The present systems and methods exert low mechanical stress on lens during lens frame fitting and continue to assert low mechanical stress on the lens or frame afterward. The use of a soft cushion connector absorbs stress such as shock or impact and spreads mechanical holding or bearing stresses rather than focusing them to a small area or single point(s), as opposed to mechanical holding means such as screws, which may focus stress to a very focused point or area. Likewise, the use of the present cushion connectors lowers risk of lens coating crack.

Various features may be implemented in accordance with embodiments of the present systems and methods. For example the material comprising the cushion connectors may be clear, so as to conceal their presence, or the cushion connectors may be one of any number of colors, so as to coordinate with a frame color, clothing colors, (a) sports team color(s), or the like, such as at the will of the user, who, as noted above may selectively change eyeglass components, in accordance with embodiments of the present systems and methods.

As a further example, embodiments of the present systems and methods may be employed to provide safety glasses (prescription or not). Such safety glasses may provide a degree of flexibility at the lens to frame juncture, such as through flexing of the cushion connector(s) upon eyewear impact, that may prevent injury from rigid eyewear elements (lenses and frame), damage to such elements, or the like. Additionally or alternatively, embodiments of the present systems and methods might provide a "breakaway" feature, such as may be provided through use of less tension (e.g. smaller cushions), light lubrication of the cushions, use of self-lubricating silicone cushions, or the like. Such a breakaway feature might also, prevent injury from rigid eyewear elements (lenses and frame), damage to such elements, or the like, at impact (such as might occur when a wearer falls during an activity).

Hence, embodiments of the present systems and methods provide a superior and easier way to mount lenses into an eyeglasses frame without application of much force and with a low risk of the lens being separated from the frame during wear. Removing and mounting lenses in accordance with the present systems and methods can be easily carried out by the end user, i.e. the eyeglass-wearing customer. Embodiments of the present systems and methods make use of frame-adaptable lens edge tabs and a cushion connector that allows the lens to be easily mounted into, and flexibly maintained, by fittings defined in a frame by any eyeglass wearer and hence can be easily switched out.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. An eyeglass lens retention cushion comprising an elastic cushion body having a relaxed exterior size larger than an interior socket of a fitting defined by an eyeglasses frame and defining an interior opening having a relaxed size smaller than a tab extending from an eyeglasses lens corresponding to a position of the fitting.

2. The eyeglass lens retention cushion of claim 1, wherein the eyeglass lens comprises a pair of generally opposing tabs extending from the eyeglass lens.

3. The eyeglass lens retention cushion of claim 1, wherein the eyeglasses frame defines a pair of generally opposing fitting pairs, each fitting positioned to receive one tab extending from the eyeglass lens.

4. User configurable eyeglasses comprising:
a pair of lenses, each lens comprising at least one tab extending from the lens;
an eyeglasses frame defining at least two fittings, each fitting positioned to receive one tab extending from a corresponding lens, each fitting sized larger than the tab to be received; and
a plurality of elastic cushion connectors, each elastic cushion connector of the plurality of cushion connectors having a relaxed exterior size larger than an interior socket of one of the at least two fittings and an interior opening having a relaxed size smaller than one of the at least one tab extending from one of the pair of lenses, each elastic cushion connector of the plurality of cushion connectors being adapted to be disposed in one of the at least two fittings and to receive one of the at least one tab extending from one of the pair of lenses.

5. The user configurable eyeglasses of claim 4, wherein each lens comprises a pair of generally opposing tabs extending from the lens, and the eyeglasses frame defines a pair of generally opposing fitting pairs, each fitting positioned to receive one tab extending from the corresponding lens.

6. The user configurable eyeglasses of claim 5, wherein each lens snap-fits into the eyeglasses frame with the plurality of elastic cushion connectors tensioning each lens in the eyeglasses frame between one fitting pair.

7. The user configurable eyeglasses of claim 4, wherein the plurality of elastic cushion connectors are formed from a silicone polymer.

8. The user configurable eyeglasses of claim 4, wherein each elastic cushion connector of plurality of cushion connectors is defined in one fitting to receive one of the at least one tab extending from one of the pair of lenses.

9. A method comprising:
disposing at least one tab at an edge of an eyeglass lens, extending from the eyeglass lens;
defining a plurality of fittings in an eyeglasses frame, one of the plurality of fittings positioned to correspond to one tab extending from the eyeglass lens, each fitting defining an interior socket larger than a corresponding tab; and
disposing an elastic cushion connector between each fitting of the plurality of fittings and the corresponding tab, in a fitting socket of the respective fitting and at least partially around the corresponding tab, flexibly securing the eyeglass lens into the eyeglasses frame, wherein the elastic cushion connector has a relaxed exterior size larger than an interior socket of one of at least two fittings and an interior opening having a relaxed size smaller than one of the at least one tab extending from the eyeglass lens.

10. The method of claim 9, wherein disposing the at least one tab at the edge of the eyeglass lens comprises attaching the at least one tab to the eyeglass lens.

11. The method of claim 9, wherein disposing the at least one tab at the edge of the eyeglass lens comprises defining the at least one tab by forming or shaping the at least one tab from the eyeglass lens to extend from the eyeglass lens.

12. The method of claim 9, wherein disposing the elastic cushion connector between each fitting of the at least two fittings and the corresponding tab comprises:
placing the elastic cushion connector at least partially around the corresponding tab; and
snap-fitting elastic cushion connector and tab into the fitting socket of the respective fitting.

13. The method of claim 9, wherein disposing the elastic cushion connector between each fitting of the at least two fittings and the corresponding tab comprises:
inserting the elastic cushion connector into the fitting socket of the respective fitting;
inserting the corresponding tab into the interior opening of the elastic cushion connector; and
snap-fitting the eyeglass lens into the eyeglasses frame.

14. A method comprising:
disposing an elastic cushion connector having a relaxed outer size larger than an interior socket of a fitting defined in an eyeglasses frame and a relaxed inner opening smaller than a tab extending from an edge of an eyeglass lens into the interior socket of the fitting and around a corresponding tab extending from the edge of the eyeglass lens, between the corresponding tab and the fitting; and flexibly securing the eyeglass lens into the eyeglasses frame.

15. The method of claim 14, wherein disposing the elastic cushion connector between the corresponding tab and the fitting comprises:
   placing the elastic cushion connector at least partially around the corresponding tab; and
   snap-fitting the elastic cushion connector and the corresponding tab into the socket of the fitting.

16. The method of claim 14, wherein disposing the elastic cushion connector between the corresponding tab and the fitting comprises:
   placing the elastic cushion connector at least partially around the corresponding tab; and
   snap-fitting the elastic cushion connector and the corresponding tab into the socket of the eyeglasses frame.

17. The method of claim 14, further comprising disposing the corresponding tab extending from the edge of the eyeglass lens, wherein disposing the corresponding tab comprises attaching corresponding tab to the eyeglass lens.

18. The method of claim 14, further comprising:
   forming the corresponding tab from the eyeglass lens to extend from the eyeglass lens; and
   disposing the corresponding tab extending from the edge of the eyeglass lens.

* * * * *